United States Patent Office 3,223,741
Patented Dec. 14, 1965

---

3,223,741
HYDROCARBON PROMOTERS FOR DIMERIZATION
Julian Feldman and Bernard A. Saffer, Cincinnati, Ohio, assignors to National Distillers and Chemical Corporation, New York, N.Y., a corporation of Virginia
No Drawing. Filed Dec. 31, 1962, Ser. No. 248,260
11 Claims. (Cl. 260—666)

This invention relates to the prepartion of cycloolefins, and particularly to the production of 1,5-cyclooctadiene.

The prior art shows the production of cycloolefins dimeric compounds from conjugated open chain diolefinic compounds using a catalyst derived from nickel carbonyl by the replacement of at least one of the carbonyl groups thereof with a compound of trivalent nitrogen, phosphorus, or antimony as described by Reed in United States Patents 2,686,208 and 2,686,209, or later modifications thereof. Other dimeric products may also be produced. For example, in the production of 1,5-cyclooctadiene from 1,3-butadiene, 4-vinyl-1-cyclohexene is also formed.

It has now been found that the addition of certain substances, which are herein designated as "promotors," to the reaction mixture will enhance the selectivity of the catalyst so that the ratio of the 1,5-cyclooctadiene to 4-vinyl-1-cyclohexene formed as a product is substantially increased. The activators of this invention are hydrocarbon compounds containing at least one phenyl group in its structure. The phenyl group may form a part of a condensed ring system, as occurs for example in compounds such as fluorene, phenanthrene, anthracene, and acenaphthene; the phenyl groups may be united, as for example in the compound biphenyl; the hydrocarbon may be a phenyl substituted alkane or alkene: for example, trans-stilbene, diphenylmethane or tetraphenyl ethylene; or the hydrocarbon may be an alkyl substituted benzene, such as tertiarybutyl benzene or hexamethylbenzene.

It is an object of this invention to prepare cycloolefin dimers from open chain diolefinic compounds.

A further object of this invention is to provide a process for the preparation of 1,5-cyclooctadiene from 1,3-butadiene in which the ratio of the 1,5-cyclooctadiene to 4-vinyl-1-cyclohexene formed in the product is substantially increased.

Another object of this invention is to afford a promoter for the zerovalent nickel catalyst used in the process for cyclic dimerization of butadiene so as to obtain increased yields of 1,5-cyclooctadiene.

Further objects will be apparent to those skilled in the art from a consideration of the following description.

The starting material for this invention is a conjugated open chain diolefin. The conjugated diolefins especially suitable as starting materials for our invention have from about four to six carbon atoms. The preferred diolefins is 1,3-butadiene; other conjugated open chain diolefins, particularly 1,3-diolefins, are useful, including 2-methyl-1,3-butadiene (isoprene); 2,3-dimethyl-1,3-butadiene; 2-chloro-1,3-butadiene (chloroprene); 2,3-dichloro-1,3-butadiene; 1,3-pentadiene (piperylene); phenyl diolefins, and 2,4-hexadiene; mixed halogen derivatives may be used, including chloro-fluoro-1,3-butadiene.

The nickel catalysts used in our invention are the zerovalent nickel catalysts derived from nickel carbonyl which are known to form cyclic dimers from the above described conjugated open chain diolefins. These catalysts include compounds having the formulas:

$$[(RO)_3P]_nNi(CO)_{4-n}$$
$$(R_3P)_nNi(CO)_{4-n}$$
$$(R_3Sb)_nNi(CO)_{4-n}$$
$$(R_3As)_nNi(CO)_{4-n}$$

where $r$ is an alkyl, aryl, hetrocyclic, or other organic radical, and $n$ has a value of one or two. The preferred nickel catalysts for the process of our invention have the formula:

$$(X_3P)_2Ni(CO)_2$$

where X is $C_6H_5$ or $C_6H_5O$.

The concentration of catalyst has been conveniently utilized at about 1% of the amount of the diolefin charged. However, higher or lower catalyst concentrations are practical. As low as 0.5% of catalyst gives excellent results, and about 3% has been used successfully. A range of from between 0.1 to 10% by weight is practical.

The amount of promotor is adjusted to within a range of from between 0.05% to 30% by weight of the 1,3-butadiene charged, with a preferred range of from about 0.5% to 15%.

The yield of 1,5-cyclooctadiene varies with temperature. The polymerization reaction may be carried out at temperatures within the range of about 70° C. to 160° C. The preferred range is from about 100° to 130° C. At higher temperatures the rate of formation of 4-vinyl-1-cyclohexene by thermal dimerization of 1,3-butadiene, and also polymerization, becomes appreciable. The rate of formation of 1,5-cyclooctadiene at temperatures below about 70° C. is low for practical purposes.

Widely varying pressures have been successfully used. By way of example, dimerization according to this invention may take place at atmospheric pressure by dissolving the diolefin in a liquid mixture of solvent, catalyst, and activator, by bubbling the olefin, if gaseous, into the mixture. On the other hand, pressures as high as 1790 p.s.i. have been utilized.

If the reagents are not adequately dry, it is beneficial to pretreat with a dehydrating agent, or to incorporate a dehydrating agent in the reaction mixture. Suitable for this is ethylene oxide, calcium oxide, calcium carbide, and calcium sulfate.

Oxygen must be excluded from the reaction mixture. Even the small traces of oxygen found in ordinary nitrogen are deleterious.

It is desirable, but not essential, to use a polymerization inhibitor such as p-tertiary-butyl catechol to prevent the formation of unwanted by-products. The maximum p-tertiarybutyl catechol concentration tolerable in the reaction mixure is about 0.2% based on 1,3-butadiene. The product ratio decreases when higher concentrations are used. A small amount of polymer is generally formed when less than 0.05% inhibitor is used.

The time is not critical. The reaction is usually substantially complete within ½ to 20 hours. The preferred time is from about 2 to about 15 hours.

When the reaction is complete, the volatile constituents of the reaction mixture are removed by vacuum distillation or steam distillation from the polymeric material, calcium salts, and catalyst. The volatile constituents are condensed and the condensate fractionally distilled to recover the separate products.

The following example illustrates a method of carrying out the present invention but it is to be understood that the example is given for purposes of illustration and not of limitation.

EXAMPLE

Into a small stainless steel tube equipped with a valve at one end is charged a reaction mixture of the following components:

Calcium carbide, freshly ground _____ gm__ 0.5
Catalyst stock solution _____ ml__ 0.3
    p-Tert-butyl catechol, 1 part by weight.
    Bis(triphenyl phosphite) nickel dicarbonyl,
        10 parts by weight.
    p-Xylene, 100 parts by weight.
Promoter _____ g__ 0.3
1,3-butadiene, freshly distilled _____ ml__ 4.6

Oxygen is carefully excluded and anhydrous conditions are used. The reaction mixture is heated at 120° C. overnight by placing the tube in an oil bath equipped with thermostatic controls. In the following table the ratio of 1,5-cyclooctadiene to 4-vinyl-1-cyclohexene in the product is shown for several phenyl compounds. The promoter is commercial grade, used without purification, and the products are analyzed by vapor phase chromatography.

Table
EFFECT OF PROMOTER

| Promoter: | Ratio of 1,5-cyclooctadiene to 4-vinyl-1-cyclohexene |
|---|---|
| None | 2.9 |
| Fluorene | 5.6 |
| Phenanthrene | 4.5 |
| Anthracene | 4.1 |
| Acenaphthene | 4.8 |
| Biphenyl | 4.1 |
| Trans-stilbene | 4.1 |
| Diphenylmethane | 8.0 |
| Tetraphenylethylene | 3.7 |
| Tertiarybutyl benzene | 3.9 |
| Hexamethylbenzene | 3.2 |

The above data show the significant effects achieved by utilizing the special promoters of this invention. The use of compounds such as diphenylmethane and fluorene gave particularly outstanding results.

While particular embodiments of this invention are shown above, it will be understood that the invention is obviously subject to variations and modifications without departing from its broader aspects.

What is claimed is:

1. In a process for the production of 1,5-cyclo-octadiene by contacting 1,3-butadiene with a zerovalent nickel carbonyl catalyst derived from nickel carbonyl by the replacement of at least one of the carbonyl groups by a compound of a trivalent element selected from the group consisting of phosphorus, antimony, and arsenic, the improvement which comprises admixing with said 1,3-butadiene a minor amount of a hydrocarbon compound containing at least two phenyl groups selected from the group consisting of fluorene, biphenyl, diphenylmethane, acenaphthene, phenanthrene, anthracene, trans-stilbene, and tetraphenylethylene.

2. The process of claim 1 wherein said hydrocarbon is fluorene.

3. The process of claim 1 wherein said hydrocarbon is biphenyl.

4. The process of claim 1 wherein said hydrocarbon is diphenylmethane.

5. The process of claim 1 wherein said hydrocarbon is acenaphthene.

6. The process of claim 1 wherein said hydrocarbon is phenanthrene.

7. The process of claim 1 wherein said hydrocarbon is anthracene.

8. The process of claim 1 wherein said hydrocarbon is trans-stilbene.

9. The process of claim 1 wherein said hydrocarbon is tetraphenylethylene.

10. The process of claim 1 wherein the catalyst is bis(triphenyl phosphite) nickel dicarbonyl.

11. The process of claim 1 wherein the catalyst is bis(triphenyl phosphine) nickel dicarbonyl.

References Cited by the Examiner
UNITED STATES PATENTS

| | | | |
|---|---|---|---|
| 2,686,208 | 8/1954 | Reed | 260—666 |
| 2,686,209 | 8/1954 | Reed | 260—666 |
| 2,991,317 | 7/1961 | Sellers et al. | 260—666 |

DELBERT E. GANTZ, *Primary Examiner.*

ALPHONSO D. SULLIVAN, *Examiner.*